April 27, 1954
L. BERTELE
2,676,516
SIX-LENS OBJECTIVE CONSISTING OF
THREE MEMBERS AIR SPACED APART
Filed Oct. 18, 1952
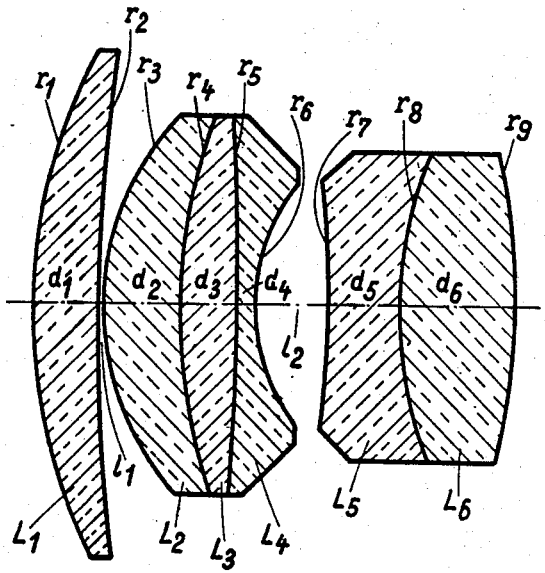

Patented Apr. 27, 1954

2,676,516

UNITED STATES PATENT OFFICE 2,676,516

SIX-LENS OBJECTIVE CONSISTING OF THREE MEMBERS AIR SPACED APART

Ludwig Bertele, Heerbrugg, Switzerland

Application October 18, 1952, Serial No. 315,534

Claims priority, application Switzerland October 24, 1951

1 Claim. (Cl. 88—57)

The present invention concerns a six lens objective consisting of three members separated by air spaces, of which the first member facing the object to be photographed is a single collective lens, the second member is a dispersing meniscus the convex outer surface of which is directed towards the object and which is composed of three lenses, and the third collective member is directed towards the image and composed of a negative lens of low refractive index and a positive lens of high refractive index which are connected by a cemented surface the convex side of which is bent towards the object to be photographed; herein the air space between the first and the second diverging member has the shape of a dispersing lens, and the air space between the second and the third member has the shape of a converging lens with its lesser curved surface directed towards the image. Objectives of this construction have become known with a relative aperture ratio of 1:2 and employed with an image angle of ±22°. With still greater image angles, comatic imaging defects appeared, produced by those light bundles which undergo too strong a deviation at the cemented surface present in the third element as a consequence of large refractive angles which deviation had to be accepted for smaller image angles in consideration of coma-free imaging. Investigations have shown that more favorable assumptions result for reducing the comatic residual errors also for image angles greater than ±22°, if, in accordance with the invention, in the third element the refractive index of the positive lens is for the $d$-line of the visible spectrum at least 0.18 greater than for the negative lens and the radius of curvature of the cemented surface is greater than 0.5 f and less than 0.8 f, f being the focal length of the objective.

Cementing of lenses $L_2$ and $L_3$, both in the second element, can be dispensed with in view of the possiblity of making the surfaces bordering on air low in reflection through coating with a suitable layer. In this case both these lenses are separated by a small air space and the facing surfaces can show slight differences in curvature.

In the following tables two execution examples of an objective in accordance with the invention are specified. Both examples have a relative aperture of 1:2 with a focal length of 100 mm. and have an available image field of ±26°. The accompanying drawing serves for illustration of both examples.

In the Example I the difference in refractive indices of the two lenses is 0.2560 for the $d$-line of the helium spectrum, hence greater than 0.18 and the radius of curvature of the cemented surface is 0.54 f.

In the Example II in the third member the difference of the refractive indices is 0.2752 and the radius of curvature of the cemented surface is 0.61 f.

Example I

Focal length=100 mm.
Ratio of relative aperture 1:2
Available image angle ca. 53°

| | Radii | Thicknesses and separations | Refractive index $n_d$ | Abbe number V |
|---|---|---|---|---|
| $L_1$ | $r_1=+ 72.48$ | $d_1= 8.58$ | 1.6910 | 54.8 |
| | $r_2=+255.60$ | $l_1= 0.38$ | | |
| $L_2$ | $r_3=+ 36.59$ | $d_2=10.11$ | 1.6910 | 54.8 |
| | $r_4=+ 74.38$ | | | |
| $L_3$ | | $d_3= 7.44$ | 1.4800 | 69.0 |
| | $r_5=-419.60$ | | | |
| $L_4$ | | $d_4= 2.29$ | 1.6810 | 31.6 |
| | $r_6=+ 25.39$ | $l_2= 9.73$ | | |
| | $r_7=-141.14$ | | | |
| $L_5$ | | $d_5= 9.54$ | 1.4645 | 65.7 |
| | $r_8=+ 54.17$ | | | |
| $L_6$ | | $d_6=15.26$ | 1.7205 | 50.2 |
| | $r_9=- 86.74$ | | | |

Example II

Focal length=100 mm.
Ratio relative aperture 1:2
Available image angle ca. 55°

| | Radii | Thicknesses and separations | Refraction index $n_d$ | Abbe number V |
|---|---|---|---|---|
| $L_1$ | $r_1=+ 72.48$ | $d_1= 8.58$ | 1.6910 | 54.8 |
| | $r_2=+255.60$ | $l_1= 0.38$ | | |
| $L_2$ | $r_3=+ 36.12$ | $d_2= 9.92$ | 1.6910 | 54.8 |
| | $r_4=+ 74.38$ | | | |
| $L_3$ | | $d_3= 7.25$ | 1.4875 | 70.0 |
| | $r_5=-448.22$ | | | |
| $L_4$ | | $d_4= 2.29$ | 1.6810 | 31.6 |
| | $r_6=+ 25.36$ | $l_2= 9.73$ | | |
| | $r_7=-150.68$ | | | |
| $L_5$ | | $d_5=10.11$ | 1.4453 | 68.0 |
| | $r_8=+ 61.03$ | | | |
| $L_6$ | | $d_6=14.88$ | 1.7205 | 50.2 |
| | $r_9=- 91.96$ | | | |

I claim:

Six lens objective consisting of three members separated by air spaces of which the first member facing the object to be photographed is a single collective lens, the second member is a dispersing meniscus the convex outer surface of which is directed towards the object and which is composed of three lenses, and the third member is converging and composed of a negative lens of low refractive index and of a positive lens of high refractive index, which lenses are connected by a cemented surface the convex side of which is bent towards the object to be photographed, whereat the air space between the first and the second member has the shape of a dispersing lens and the air space between the second and the third member has the shape of a collective lens with its more slightly curved surface facing the image, in the third member the index of refraction for the $d$ line of the positive lens is at least 0.18 greater than the refractive index of the negative lens and the radius of curvature of the cemented surface is greater than 0.5 f and less than 0.85 f, whereby f represents the total focal length of the objective.

References Cited in the file of this patent

UNITED STATES PATENTS

| Number | Name | Date |
|---|---|---|
| 1,998,704 | Bertele | Apr. 23, 1935 |
| 2,029,806 | Bertele | Feb. 4, 1936 |
| 2,124,356 | Rayton | July 19, 1938 |
| 2,188,523 | Bertele | Jan. 30, 1940 |